Patented June 13, 1939

2,162,185

UNITED STATES PATENT OFFICE 2,162,185

ART OF PREPARING AN EARTHEN FOUNDATION

James A. Sourwine, Washington, D. C.

No Drawing. Application June 15, 1938, Serial No. 213,939

5 Claims. (Cl. 61—50)

This application relates to improvements in the art of preparing an earthen foundation, consisting of new methods of preparation, to ensure stability therein against ground freezing and ground heaving, which new methods are the subject of this specification.

This invention has for its purpose the providing of an earthen subgrade foundation which shall resist the entrance of water in capillary form and by so doing shall limit the occurrence of ground freezing and of ground heaving in such earthen foundation. Though particularly adapted for use in highway construction, my invention is valuable in connection with the preparing and/or laying of earthen subgrade foundations of all sorts, including foundations of buildings, airway flying and landing fields, sewers, artificial water channels, earth retaining walls and other structures.

My invention consists in placing or forming within an earthen foundation and as a part thereof, a treated layer of soil or other earthen material, which has first been air-dried, and which after being air-dried has been mixed, impregnated or filled with a liquid other than water and having a lower freezing point than water; and in superimposing upon and contiguous to this liquid treated layer, an upper course or layer of soil or earthen material which has been spread and dried by exposure to air or which by some mechanical process has been rendered air-dried.

Any of several liquids may be used, as will readily be seen from the further explanation and examples below. Several alcohols, either undiluted or in solution or in chemical combination with other liquids, are suitable for use. Potassium hydroxide may be used. Several of the kerosenes are suitable. Ammonia, and various ammonia compounds may be used, as may other fluid compounds and solutions of nitrogen. Asphalt in any form, or bituminous or asphaltic oil, or bituminous or asphaltic material in emulsion form or any form of sulfide wastes, or residual liquors, all as now commonly used in road construction, are not suitable for use as any part of this invention, nor is any admixture of calcium chloride or sodium chloride. In general, any liquid other than water, carrying in suspension less than one and one-half percent of solid matter, having a freezing point lower than water, and possessing the physical capacity to form a thin capillary film, is suitable for use. It will readily be seen that choice of a liquid may be varied in accordance with the freezing point desired, as modified by the depth at which the treated layer of earthen foundation is desired to be placed, and as required to fit local conditions of climate and of soil, and that the relatively wide range of liquids suitable for use to fill the pores of the treated layer of soil, is a distinct advantage.

By thus providing artificially for the filling of the pores in a layer of foundation soil, with a liquid other than water, I prevent the movement upward of capillary water. The filling liquid with which the lower layer of foundation soil has been treated, acting in accordance with the principles of capillary movement of a liquid in soil, distributes itself upward into the capillary pores of the air-dried soil above the liquid treated layer, such movement beginning as soon as the upper layer of air-dried soil has been put in place as part of the subgrade foundation, and continuing until a condition of capillary stability obtains; the condition of capillary stability then existing, the capillary liquid in place resists displacement from the foundation soil, in accordance with the laws of capillary retention of a liquid in capillary suspension in soil; and the presence of the filling liquid in the pores of the soil operates to resist, limit, and prevent entrance into the soil, by capillary movement, of water in capillary form, coming from a lower free water level; and by so doing operates to limit and to prevent the presence in the subgrade foundation of water in capillary form, and to obviate the swelling or shrinking of soil volume and consequent instability of subgrade surface resulting therefrom. At the same time, by causing a section of the subgrade foundation to become impregnated with a filling liquid other than water and having a lower freezing point than water, I lower the critical temperature at which ground freezing may occur in the treated subgrade soil, below the actual temperature which occurs at that point, I prevent the occurrence of freezing in the subgrade foundation soil, and I maintain the stability of the earthen subgrade foundation.

It may be remarked that the essence of my invention is the introduction into the subgrade of a layer of liquid filled soil which is non-freezing at the temperatures to which exposed, and that the method by which it is placed is not of importance as modifying the results to be obtained; so that any accepted method of laying earthen subgrade foundation may be used for placing and compacting the treated layer and the upper air-dried layer of soil, and the degree of compaction may be determined on the basis of the factors which would normally control.

I claim:

1. The method of preparing an earthen foundation, consisting of the placement within an earthen foundation, and as a part thereof, of a layer of soil or earthen material which has been mixed with a liquid other than water and having a freezing point lower than that of water.

2. The method of preparing an earthen foundation, consisting of the impregnation of an approximately horizontal layer within an earthen subgrade foundation, with a liquid other than water and having a lower freezing point than water.

3. The method of forming a subgrade foundation construction consisting of an under course or layer of treated earth or earthen material, comprising impregnating the layer of material with a liquid, other than water and having a freezing point lower water, and placing an upper layer of air-dried soil upon and contiguous to said treated soil layer.

4. The method of forming a subgrade foundation consisting of an under course or layer of treated earth or earthen material, comprising impregnating the layer of material with a liquid other than water and having a freezing point lower than water, said liquid carrying in suspension less than one and one-half percent of solid matter, and placing an upper layer of air-dried soil upon and contiguous to said treated soil layer.

5. The method of forming a subgrade foundation consisting of an under course or layer of treated earth or earthen material, comprising impregnating the layer of material with a liquid other than water and having a freezing point lower than water, said liquid possessing the physical capacity to form a thin capillary film, and placing an upper layer of air-dried soil upon and contiguous to said treated soil layer.

JAMES A. SOURWINE.